US011383766B2

(12) United States Patent
Takahashi et al.

(10) Patent No.: US 11,383,766 B2
(45) Date of Patent: Jul. 12, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventors: Naoki Takahashi, Miyoshi (JP); Shunji Shibata, Anjo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 18 days.

(21) Appl. No.: 17/136,005

(22) Filed: Dec. 29, 2020

(65) Prior Publication Data

US 2021/0221442 A1 Jul. 22, 2021

(30) Foreign Application Priority Data

Jan. 17, 2020 (JP) .............................. JP2020-006332

(51) Int. Cl.
*B62D 25/02* (2006.01)
*B62D 27/02* (2006.01)

(52) U.S. Cl.
CPC ......... *B62D 25/025* (2013.01); *B62D 27/023* (2013.01)

(58) Field of Classification Search
CPC ...... B62D 25/025; B62D 27/023; B60K 1/04; B60K 2011/0405
USPC ............................................ 296/209, 187.12
See application file for complete search history.

(56) References Cited

U.S. PATENT DOCUMENTS

| 8,696,051 | B2 * | 4/2014 | Charbonneau | ....... B62D 25/025 296/187.12 |
| 10,259,506 | B2 * | 4/2019 | Ayukawa | ............. B62D 25/025 |
| 2012/0161429 | A1 * | 6/2012 | Rawlinson | ........... B62D 25/025 280/801.1 |
| 2017/0305251 | A1 * | 10/2017 | Hara | ....................... B60L 50/64 |
| 2018/0126933 | A1 * | 5/2018 | Kawase | .................. B60K 1/04 |
| 2020/0140021 | A1 * | 5/2020 | Grottke | ................ B62D 25/025 |

FOREIGN PATENT DOCUMENTS

| JP | 2017226353 | A | * | 12/2017 |
| JP | 201875939 | A | | 5/2018 |
| WO | WO-2020166336 | A1 | * | 8/2020 |

* cited by examiner

*Primary Examiner* — Dennis H Pedder
(74) *Attorney, Agent, or Firm* — Hauptman Ham, LLP

(57) ABSTRACT

A vehicle body lower structure may include: a rocker; a power source; an energy absorbing member (EA member) arranged under the rocker; and a collar penetrating an upper plate of the EA member. The EA member includes a first vertical plate, a second vertical plate, and a diagonal brace; the first vertical plate and the second vertical plate connect the upper and lower plates to each other, the first vertical plate is arranged adjacent to the collar, the second vertical plate is arranged adjacent to the first vertical plate on an opposite side from the collar, and the diagonal brace connects a first inner corner where the first vertical plate meets the lower plate and a second inner corner where the second vertical plate meets the upper plate.

4 Claims, 5 Drawing Sheets

VEHICLE BODY LOWER STRUCTURE

CROSS-REFERENCE TO RELATED APPLICATION

This application claims priority to Japanese Patent Application No. 2020-006332 filed on Jan. 17, 2020, the contents of which are hereby incorporated by reference into the present application.

TECHNICAL FIELD

The art disclosed herein relates to a vehicle body lower structure. It relates, in particular, to a vehicle body lower structure in which a power source is arranged adjacent to a rocker.

BACKGROUND

In electric vehicles, a power source configured to supply power to a traction motor may be arranged adjacent to a rocker. The power source may be a battery, a fuel cell, or the like. The rocker is a frame (hollow beam)) extending along a from-rear direction of the vehicle body at a lower lateral part of the vehicle body. The rocker may also be referred to as "side sill".

In order to protect the power source from an impact of lateral collision to the lateral part of the vehicle body, a member (energy absorbing member) configured to absorb impact energy caused by lateral collision may be disposed along a rocker. Japanese Patent Application Publication No. 2018-75939 describes an example of the energy absorbing member. The energy absorbing member described in Japanese Patent Application Publication No. 2018-75939 extends along a front-rear direction of a vehicle body and disposed under a rocker. To achieve both strength and a function of absorbing energy, the energy absorbing member is hollow, and includes a reinforcement plate therein. Hereafter, an energy absorbing member may be referred to as "EA member" for convenience of description.

SUMMARY

To provide a clearance between a rocker and an EA member, a collar (tubular member) which penetrates an upper plate of the LA member and includes an upper end being in contact with the rocker and a lower end being in contact with a lower plate of the EA member may be employed. The collar is welded to the upper plate. In addition to such a configuration, it is desirable that a reinforcement plate is disposed in the EA member to enhance strength of the EA member. If the reinforcement plate is connected to a vicinity of a welding point between the collar and the upper plate, a heat generated in welding may be diffused to the reinforcement plate, by which the collar may not be securely welded to the upper plate.

A vehicle body lower structure disclosed herein may comprise a plurality of vertical plates each connecting an upper plate and a lower plate of an EA member to each other. Among the vertical plates, a vertical plate adjacent to the collar is referred to as a first vertical plate, and a vertical plate arranged adjacent to the first vertical plate on an opposite side from the collar is referred to as a second vertical plate. It is desirable that a diagonal brace is disposed between the first vertical plate and the second vertical plate for further reinforcement of the EA member. However, if the diagonal brace (reinforcement plate) is connected to an inner corner where the first vertical plate meets the upper plate, the diagonal brace (reinforcement plate) is connected to the vicinity of the welding point between the collar and the upper plate are welded to each other.

Given the above, in the vehicle body lower structure disclosed herein, the diaconal brace connects a first inner corner where the first vertical plate meets the lower plate and a second inner corner where the second vertical plate meets the upper plate. Since a portion to which the diagonal brace is connected is spaced apart from the welding point between the collar and the upper plate, strength of the welding portion between the collar and the upper plate is retained.

The diagonal brace is useful for preventing deformation of EA members in a structure in which the power source is supported by the pair of EA members. A rocker and a corresponding one of the EA members may be fixed to each other with a bolt passing through the collar. A bulkhead may be disposed in each of the rockers as a reinforcement member. In such a case, the rocker, the bulkhead, and EA member may be fixed to each other with the bolt.

Further, a thickness of the upper plate of the EA member in an area between a pair of vertical plates may be thicker than a thickness of the upper plate outside of the area. An amount of heat diffused to the upper plate in wending may be reduced by decreasing the thickness of the upper plate in an area apart from the bolt.

Details and further developments of the art disclosed herein will be described in DETAILED DESCRIPTION as below.

DETAILED DESCRIPTION

Embodiment

Figure 1:
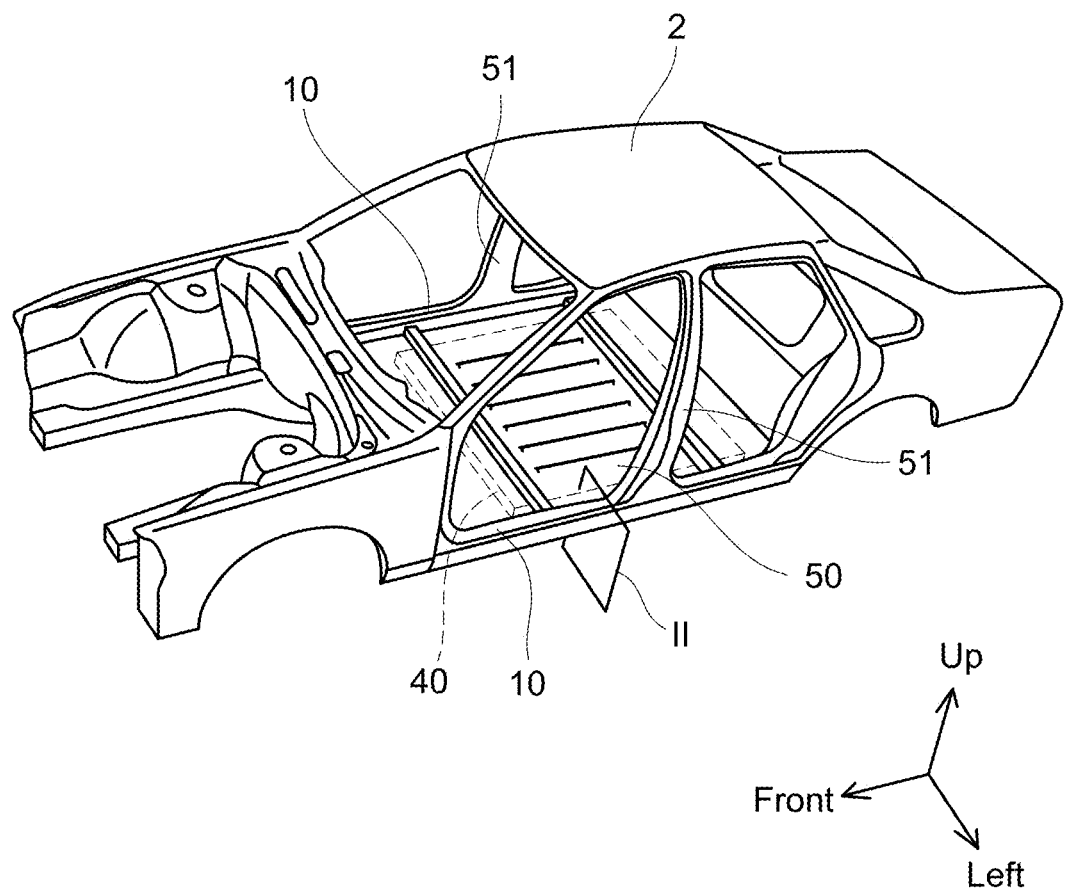
FIG. 1 is a perspective view of a vehicle body.

A vehicle body lower structure 3 according to an embodiment will be described with reference to the drawings. FIG. 1 illustrates a perspective view of a vehicle body 2. In the coordinate system of FIG. 1, "Left" indicates "left" when the vehicle body is viewed from the rear toward the front. The "Left" in the coordinate system has the same meaning in all of the drawings.

The vehicle body 2 comprises a pair of rockers 10. The rockers 10 are arranged respectively at lower lateral parts of the vehicle body 2 in a vehicle-width (left-right) direction. Each rocker 10 has an elongated shape and extends along a front-rear direction of the vehicle body 2. Lower ends of center pillars 51 are connected respectively to the rockers 10 at vicinities of centers of the rockers 10 in a longitudinal direction of the rockers 10. The pair of rockers 10 and the center pillars 51 are one type of frame configured to secure rigidity of the vehicle body 2. Each of the rockers 10 is formed by press working operations for a metal plate (typically, a steel plate).

A battery pack 40 and a floor panel 50 are arranged between the pair of rockers 10. In other words, the battery pack 40 and the floor panel 50 are arranged adjacent to each of the rockers 10. The battery pack 40 includes a large number of battery cells therein. The plurality of battery cells is connected in series, and capable of outputting a high voltage. The battery pack 40 (the plurality of battery cells) is configured to supply the power to an electric traction motor (not shown).

The floor panel 50 corresponds to a floor of a cabin. Ends of the floor panel 50 in the vehicle-width direction are fixed respectively to the rockers 10. The battery pack 40 is arranged under the floor panel 50. Although details will be described later, energy absorbing members (not shown in FIG. 1) are arranged respectively along the rockers 10, and the battery pack 40 is supported by the pair of rockers 10 via the energy absorbing members. The battery pack 40 may be supported by the rockers 10 via the floor panel 50 as well as via the energy absorbing members.

The energy absorbing members are arranged on both sides of the battery pack 40 in the vehicle-width direction. Hereafter, the energy absorbing member(s) will be referred to as EA member(s) for convenience of description.

Figure 2:
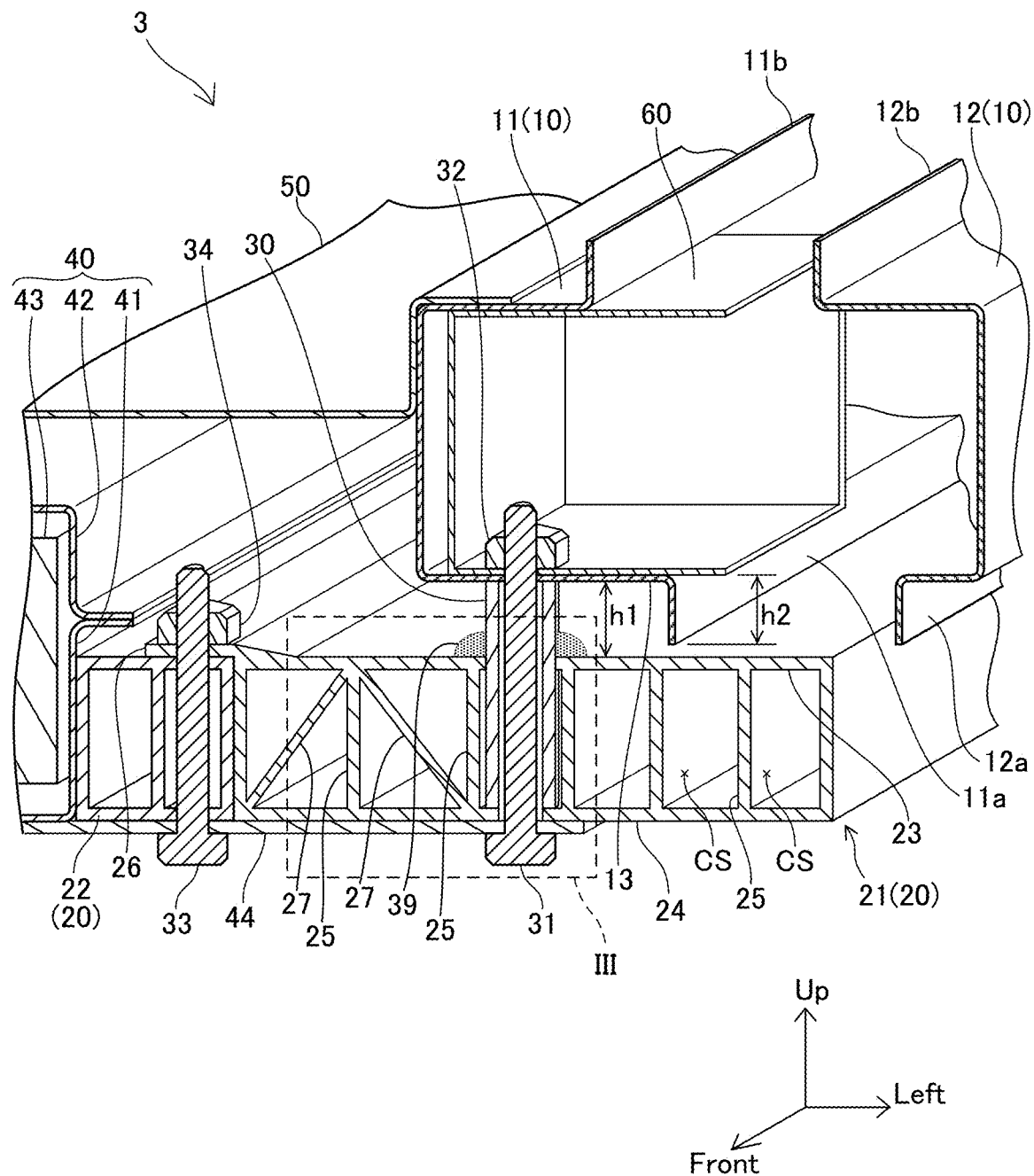
FIG. 2 is a cross-sectional view of the vehicle body cut along a plane II of FIG. 1.

FIG. 2 shows a cross section of the vehicle body 2 cut along a plane II in FIG. 1. FIG. 2 shows a left part of the lower structure 3 of the vehicle body 2. As aforementioned, the battery pack 40 is fixed to the rockers 10 via the EA members 20 (energy absorbing members 20) at lower right and lower left parts of the vehicle body 2. The left part of the lower structure 3 of the vehicle body 2 will be described hereinafter. The vehicle body 2 is symmetrical with respect to the left-right direction, thus the right part of the lower structure 3 of the vehicle body 2 has the same structure as that of FIG. 2. That is, the vehicle body lower structure 3 of the embodiment comprises the pair of rockers 10 and the pair of EA members 20, and each of the EA members 20 is arranged along corresponding one of the pair of rockers 10. Hereinafter, one of the rockers 10 that is arranged at the left part of the vehicle body 2 (left rocker 10) and one of the EA members 20 that is fixed to this rocker 10 will be described.

The battery pack 40 comprises a lower cover 41, an upper cover 42, and a plurality of battery cells 43. A container is configured by the lower cover 41 and the upper cover 42, and the plurality of battery cells 43 is housed within the container. Each of the lower cover 41 and the upper cover 42 is provided with a flange, and the container is configured by the flanges of the lower cover 41 and the upper cover 42 being joined.

The rocker 10 is configured of a rocker inner panel 11 and a rocker outer panel 12. The rocker inner panel 11 has a square U shape (a channel shape) and is disposed with the U shape lying down on its side. The rocker inner panel 11 includes a lower flange 11a and an upper flange 11b. The lower flange 11a extends downward from a lower edge of the lying U shape of the rocker inner panel 11. The upper flange 11b extends upward from an upper edge of the lying U shape of the rocker inner panel 11. The rocker outer panel 12 has the same shape as the rocker inner panel 11. The rocker outer panel 12 includes a lower flange 12a and an upper flange 12b, and the lower flange 12a and the upper flange 12b face the lower flange 11a and the upper flange 11b of the rocker inner panel 11, respectively. The lower flanges 11a and 12a are welded to each other and the upper flanges 11b and 12b are welded to each other, which results in the rocker 10 having a hollow rectangular tube shape. In FIG. 2, the rocker outer panel 12 is depicted apart from the rocker inner panel 11 to help understanding.

A bulkhead 60 is arranged in the rocker 10. The bulkhead 60 is a reinforcement member for enhancing strength of the rocker 10. The bulkhead 60 is attached to inside of the rocker inner panel 11 before the rocker inner panel 11 and rocker outer panel 12 are joined to each other. The bulkhead 60 is fixed to the rocker inner panel 11 by welding or with a bolt (not shown). A nut 32 is fixed to inside of the bulkhead 60 by welding. The nut 32 is fixed to the rocker inner panel by welding.

The EA member 20 is configured of a first EA member 21 and a second EA member 22. The first EA member 21 is arranged under the rocker 10. The second EA member 22 is arranged between the first EA member 21 and the battery pack 40. The first EA member 21 is fixed to the rocker 10. The second EA member 22 is connected to the first EA member 21 and also connected to the battery pack 40.

The EA member 20 (each of the first EA member 21 and the second EA member 22) has a hollow rectangular gibe shape. In other words, the EA member 20 (each of the first EA member 21 and the second EA member 22) is a hollow beam. The EA member 20 is configured to absorb collision energy caused by a lateral collision to the vehicle to protect the battery pack 40. The EA member 20 is configured to absorb the collision energy by being crushed in the vehicle-width direction by an impact of the collision. The rocker 10 also contributes to absorption of the collision energy, however, the rocker 10 alone may be insufficient to absorb all the collision energy on its own. To address this, the hollow EA member 20 is arranged along the rocker 10.

Strength of the EA member 20 is determined in advance, for example, by simulation such that the EA member 20 can effectively absorb the collision energy. An inner space of the first EA member 21 is partitioned into several cell spaces CS by a plurality of vertical plates 25 which connects an upper plate 23 and a lower plate 24 of the first EA member 21 to each other. In each of the several cell spaces, a diagonal brace 27 diagonally extending in the rectangular cell space is disposed. The strength of the first EA member 21 can be adjusted by appropriately selecting respective numbers and/or thicknesses of the vertical plate 25 and the diagonal brace 27. The strength of the EA member 20 is set lower than at least strength of the battery pack 40. However, the EA member 20 has enough strength to support the battery pack 40.

As aforementioned, the first EA member 21 is arranged under the rocker 10. Meanwhile, the rocker 10 is provided with the lower flange 11a (12a) extending downward from a bottom plate 13 of the rocker 10. The first EA member 21 needs to be arranged such that it can avoid interference with the lower flange 11a (12a). If the first EA member 21 is divided into an inner portion and an outer portion relative to the lower flange 11a (12a), the structure of the EA member thereby becomes complex. It should be noted that the "inner portion relative to the lower flange 11a (12a)" means a portion of the first EA member 21 that is closer to a vehicle center than the lower flange 11a (12a) in the vehicle-width direction. Similarly, the "outer portion relative to the lower flange 11a (12a)" means a portion of the first EA member 21 that is farther from the vehicle center than the lower flange 11a (12a) in the vehicle-width direction.

In the vehicle body lower structure 3 of the embodiment, the interference between the first EA member 21 and the lower flange 11a (12a) can be avoided by a collar 30 being arranged between the first EA member 21 and the rocker 10. Placing the first EA member 21 under the lower flange 11a (12a) allows the first EA member 21 to have a simple shape and extend to a position that is on outer side relative to the lower flange 11a (12a) in a vehicle-width direction.

The collar 30 is a metal cylinder. In other words, the collar 30 is a spacer configured to secure a clearance between the rocker 10 and the first EA member 21. As shown in FIG. 2, a height h1 of the collar 30 above the first EA member 21 is greater than a height h2 of the lower flange 11a (12a), The collar 30 secures a clearance of distance h1 between the bottom plate 13 of the rocker 10 and the upper plate 23 of the first EA member 21. Because the height of the lower flange 11a (12a) is h2 (<h1), the lower flange 11a (12a) does not interfere with the first EA member 21. Thus, a simple rectangular tube shape can be employed as the shape of the first EA member 21, manufacturing costs for the EA member 21 can thereby be reduced.

A structure around the collar 30 will be described. The collar 30 passes through a hole 23a provided in the upper plate 23 of the first EA member 21. An upper end of the collar 30 is in contact with a lower surface of the bottom plate 13 of the rocker 10. A lower end of the collar 30 is in contact with an upper surface of the lower plate 24 of the first EA member 21. The collar 30 is welded to the upper plate 23. A weld head 39 is provided at a portion where the collar 30 meets the upper plate 23.

The first EA member, the rocker 10, and a bulkhead 60 are joined together and fixed to each other with the nut 32 and the bolt 31 passing through the collar 30.

When the battery pack 40 vibrates up and down while the vehicle is running, the collar 30 also vibrates up and down, and thus a vibration load is applied to the rocker 10 in an up-down direction. A deformation of the rocker 10 caused by the vibration load applied from the collar 30 is small because the bulkhead 60 and the bottom plate 13 are arranged between the collar 30 and the nut 32.

A support plate 44 extends outward from a lower surface of the battery pack 40 in the vehicle-width direction. The support plate 44 and the first EA member 21 are also joined together and fixed to each other with the bolt 31 and the nut 32. The battery pack 40 can be fixed to the EA member 20 firmly by fixing the support plate 44 extending from the battery pack 40 to the first EA member 21.

A connecting structure of the first EA member 21 and the second EA member 22 will be described. A flange 26 extends from an end of the upper plate 23 of the first EA member 21 towards the vehicle center in the vehicle-width direction. The second EA member 22 is fixed to the flange 26 of the first EA member 21 with a bolt 33 and a nut 34. The support plate 44 extending from the battery pack 40 is also fixed to the second EA member 22 with the bolt 33. The second EA member 22 is held and fixed between the flange 26 of the first EA member 21 and the support plate 44 of the battery pack 40. The second EA member 22 is bonded to a side surface of the lower cover 41 of the battery pack 40. The battery pack 40 and the second EA member 22 are fixed firmly to each other with the bolt 33 and adhesive material.

The EA member 20 is divided into the first EA member 21 which is fixed to the rocker 10 and the second EA member 22 which is bonded to the battery pack 40. The second EA member 22 is detachable from the first EA member 21. The EA member 20 can be applied to a variety of vehicles having different body widths by selecting a second EA member having an appropriate width from among a variety of second EA members 22 having different widths and combining the selected second EA member 22 with the first EA member 21.

Figure 3:
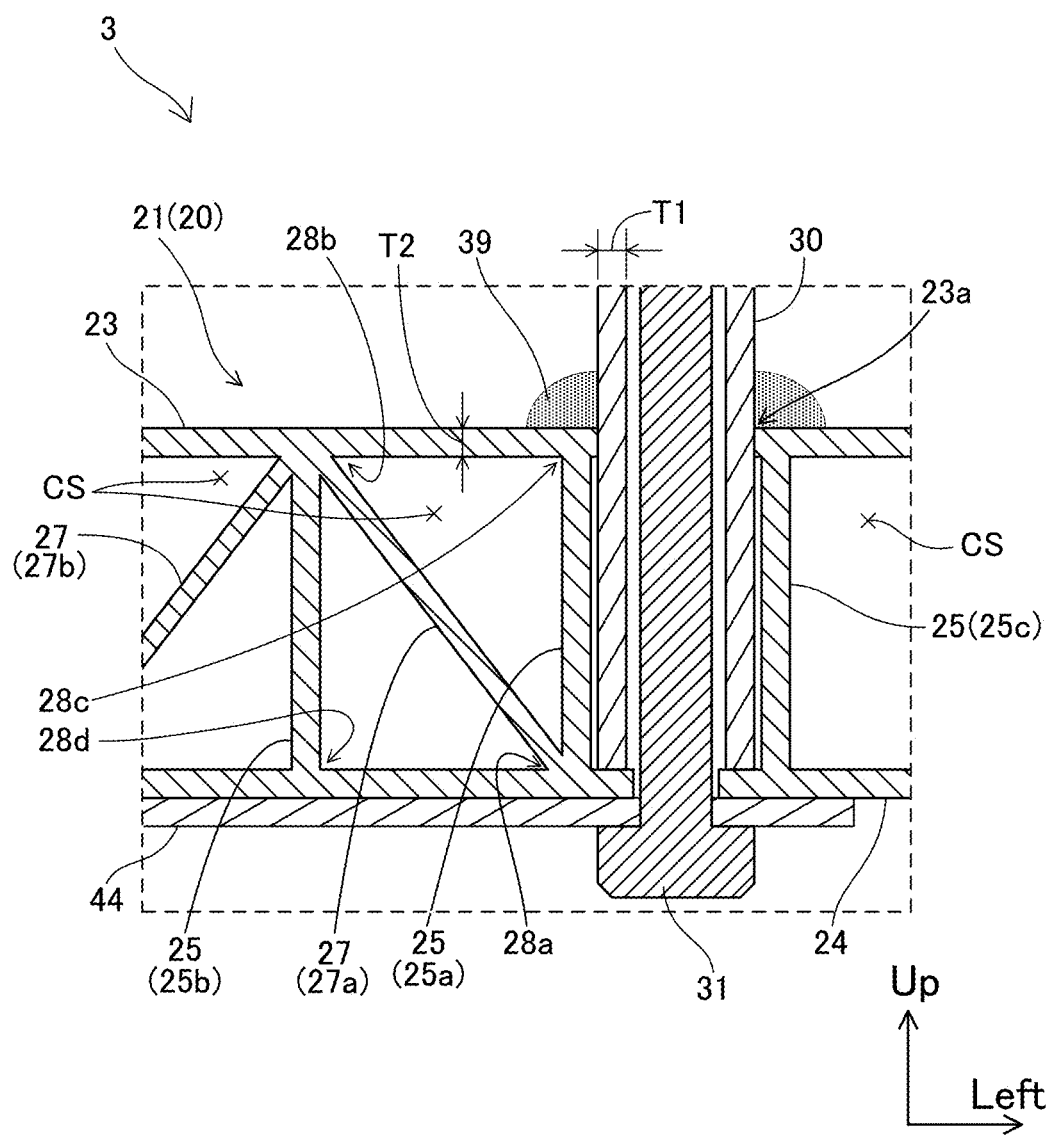
FIG. 3 shows an enlarged view of an area surrounded by a broken line III of FIG. 2.

The structure around the collar 30 will be more specifically described. FIG. 3 shows an enlarged view of an area in a rectangle III of FIG. 2 surrounded by a broken line. As described above, the first EA member 21 has a hollow rectangular tube shape, and includes several vertical plates 25 and diagonal braces 27 therein. The vertical plates 25 connect the upper plate 23 and the lower plate 24 of the first EA member 21 to each other. The vertical plates 25 extend along the front-rear direction of the vehicle within the first EA member 21. Here, one of the vertical plates 25 adjacent to a left side (left side in a viewpoint of FIG. 3) of the collar 30 is referred to as a first vertical plate 25a, and one of the vertical plates 25 adjacent to the first vertical plate 25a on an opposite side from the collar 30 is referred to as a second vertical plate 25b. One of the vertical plates 25 adjacent to a right side (right side in a viewpoint of FIG. 3) of the collar 30 is referred to as a third vertical plate 25c.

An inner space of the first EA member 21 is partitioned into several cell spaces CS by several vertical plates 25. The cell spaces CS have a rectangular shape. The diagonal braces 27 are respectively disposed in the several cell spaces. Each of the diagonal braces 27 extends in a diagonal direction of a rectangular shape of a corresponding cell space. The diagonal braces 27 extend along the front-rear direction of the vehicle within the first EA member 21.

One of the diagonal braces 27 disposed between the first vertical plate 25a and the second vertical plate 25h is referred to as a diagonal brace 27a. The diagonal brace 27a connects a first inner corner 28a where the first vertical plate 25a meets the lower plate 24 and a second inner corner 28b where the second vertical plate 25b meets the upper plate 23. The diagonal brace 27a is disposed between the first inner corner 28a and the second inner corner 28b, not between a third inner corner 28e where the first vertical plate 25a meets the upper plate 23 and a fourth inner corner 28d where the second vertical plate 25b meets the lower plate 24. This orientation of the diagonal brace 27a is employed not to decrease strength of a welding point between the collar 30 and the upper plate 23. The reason will be described later.

A thickness T2 of the upper plate 23 is substantially equal to a thickness T1 of the collar 30 (a thickness T1 of a cylinder of the collar 30), or slightly smaller than the thickness More specifically, a ratio of the thickness T2 to the thickness T1 is from 0.5 to 1.0. The first vertical plate 25a is connected to the upper plate 23 in the vicinity of the collar 30. Heat generated in welding the collar 30 is diffused to the first vertical plate 25a. A speed in which heat diffuses in the upper plate 23 having the thickness T2 is substantially equal to a speed in which heat diffuses in the collar 30 having the thickness T1. In other words, in terms of heat diffusion, the thickness T2 of the upper plate 23 (the thickness T2 at a portion where the upper plate 23 meets the collar 30) is substantially equal to the thickness T1 of the collar 30.

If intersecting two plates (the collar 30 and the upper plate 23) are welded to each other, it is desirable that thicknesses of the two plates are substantially equal. If the thicknesses of the two plates are greatly different, a heat of welding is diffused in one plate having a greater thickness, and a temperature of the one plate rises more slowly as compared to the other plate having a smaller thickness. Due to this, in welding, the temperature of the plate having the smaller thickness becomes higher than the temperature of the plate having the greater thickness. Thus, there is a risk that the plate having the smaller thickness melts before a welding material melts on the plate having the greater thickness. When the plate having the smaller thickness melts, strength of the welded point is decreased.

Figure 4:
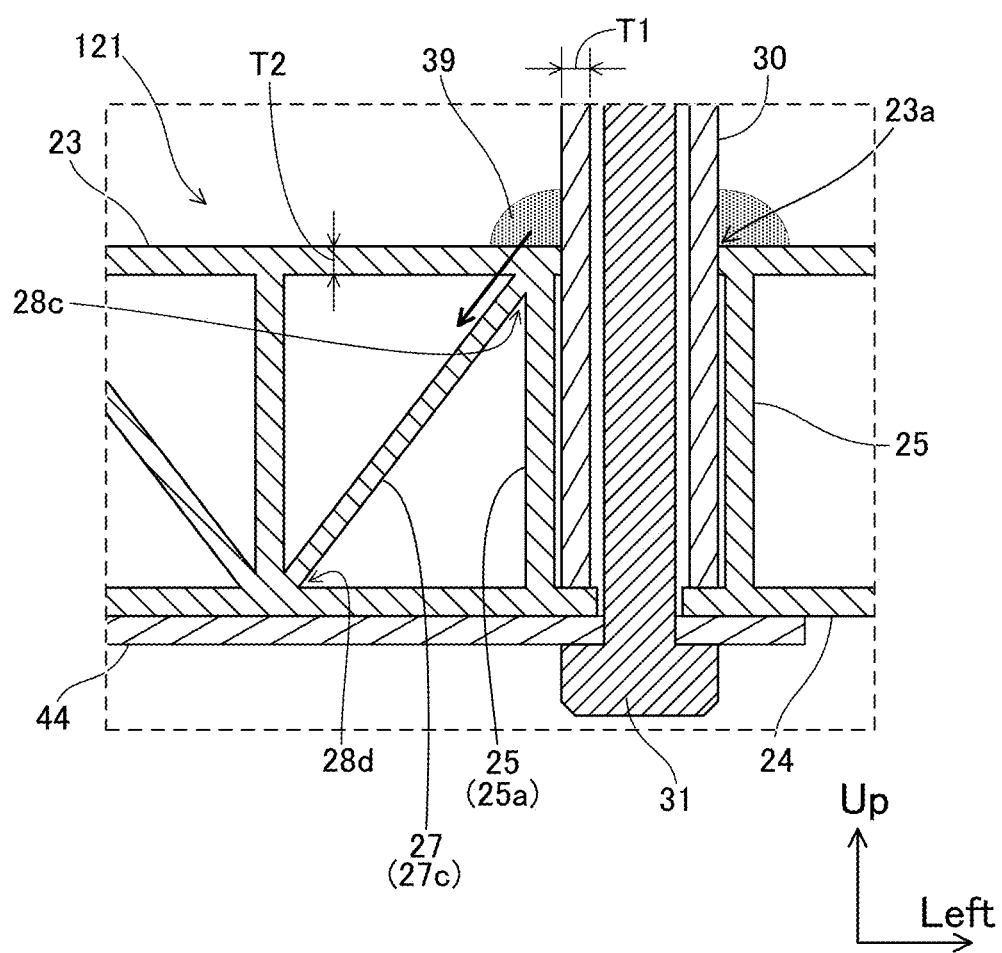
FIG. 4 shows a cross-sectional view of a vehicle body lower structure of a comparative example.

FIG. 4 shows, as a comparative example, a cross-section of a first EA member 121 in which a diagonal brace 27c is disposed between the third inner corner 28c where the first vertical plate 25a meets the upper plate 23 and a fourth inner corner 28d where the second vertical plate 25b and the lower plate 24. An upper end of the diagonal brace 27c is connected to a vicinity of the welding point between the upper plate 23 and the collar 30. Due to this, as shown by a thick arrow line in FIG. 4, a heat of welding is diffused to the diagonal brace 27c. As a result, in welding, the collar 30 is overheated and thereby melts before a temperature of the upper plate 23 becomes sufficiently high. This decreases strength of the welding point between the collar 30 and the upper plate 23.

As shown in FIG. 3, in the vehicle body lower structure 3 of the present embodiment, the diagonal brace 27a is positioned between the first inner corner 28a and the second inner corner 28b such that the diagonal brace 27a is apart from the welding point between the upper plate 23 and the collar 30. Due to the structure of FIG. 3, the strength of the welding point between the collar 30 the upper plate 23 can be retained while the diagonal brace 27a is included.

An advantage of including the diagonal brace 27 will be described below. As shown in FIG. 2, the battery pack 40 is supported by the EA member 20, and the EA member is fixed to the rocker 10 by the bolt 31. A weight of the battery pack 40 is applied to portion of the EA member 20 close to the battery pack 40. Due to this, a shear force is applied in the up-down direction to the first EA member 21 between the battery pack 40 and the bolt 31. Due to this shear force, the EA member 21 deforms. The diagonal brace 27a (and a diagonal brace 27b disposed at a portion closer to the battery pack 40 than the diagonal brace 27a) prevents deformation of the first EA member 21.

The shear force is great between the battery pack 40 and the bolt 31 and small at a portion farther from the battery pack 40 than the bolt 31. Due to this, the diagonal brace is not disposed on the third vertical plate 25c at the portion farther from the battery pack 40 than the bolt 31.

Figure 5:
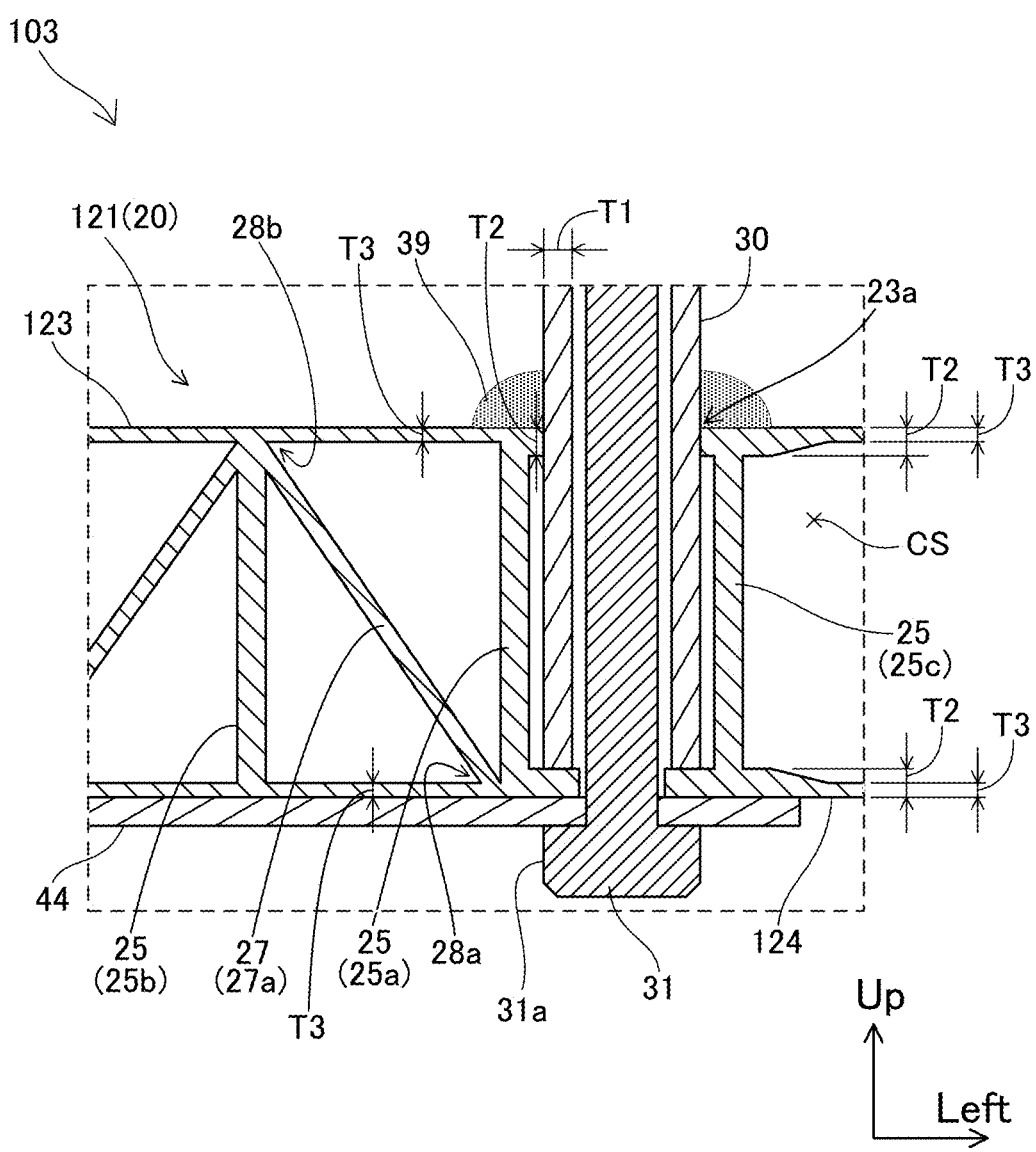
FIG. 5 shows a cross-sectional view of a vehicle body lower structure of a variant.

(Variant) A vehicle body lower structure 103 of a variant will be described with reference to FIG. 5. FIG. 5 is a cross-sectional view corresponding to FIG. 3 and shows a cross-section around the collar 30. In the vehicle body lower structure 103 of the variant, a thickness of an upper plate 123 of a first EA member 121 changes at a point. A thickness of a lower plate 124 also changes at a point. Except for the thicknesses of the upper plate 123 and the lower plate 124, the vehicle body lower structure 103 of the variant is equal to the vehicle body lower structure 3 of the embodiment.

The upper plate 123 has a great thickness (a thickness T2) in an area between a pair of vertical plates (the first vertical plate 25a and the third vertical 25c) adjacent to the collar 30, and has a smaller thickness (a thickness T3) outside of the area between the pair of vertical plates (the first vertical plate 25a and the third vertical plate 25c). The thickness T2 of the upper plate 123 in an area between the pair of vertical plates (the first vertical plate 25a and the third vertical plate 25c) is equal to or slightly smaller than the thickness of the collar 30. Similar to a case of the embodiment, a ratio of the thickness T2 to the thickness T1 is from 0.5 to 1.0. The first vertical plate 25a and the third vertical plate 25c are connected to the upper plate 123 in the vicinity of the collar 30. Heat generated in welding the collar 30 is diffused to the first vertical plate 25a and the third vertical plate 25c. A speed in which heat diffuses in the upper plate 123 having the thickness T2 is substantially equal to a speed in which heat diffuses in the collar 30 having the thickness T1. In other words, in terms of heat diffusion, the thickness T2 of the upper plate 123 (the thickness T2 in the area between the first vertical plate 25a and the third vertical plate 25c) is substantially equal to the thickness T1 of the collar 30.

A thickness T3 of the upper plate 123 outside the area between the pair of vertical plates (the first vertical plate 25a and the third vertical plate 25c) is smaller than the thickness T2. The first vertical plate 25a and the third vertical plate 25c are connected to the upper plate 123 in a vicinity of a welding point between the collar 30 and the upper plate 123 (a point of a weld bead 39 of FIG. 5). Heat generated in welding is diffused to the first vertical plate 25a and the third vertical plate 25c. As a result, in welding, the temperature of the upper plate 123 rises more slowly than that of the collar 30. An amount of heat diffused to the upper plate 123 in welding can be reduced by decreasing the thickness T3 of the upper plate 123 outside the area between the pair of vertical plates (the first vertical plate 25a and the third vertical plate 25c). As a result, a temperature difference between the collar 30 and the upper plate 123 in welding becomes smaller, which can prevent decrease in strength of the welding point.

Also, a thickness T3 of the lower plate 124 outside the area between the pair of vertical plates (the first vertical plate 25a and the third vertical plate 25c) is smaller than a thickness T2 of the lower plate 124 in the area between the pair of vertical plates adjacent to the collar 30. This aims at enhancing strength by increasing the thickness of the lower plate 124 in an area overlapping a head 31a of the bolt 31. Further, this also aims at reducing a weight of the lower plate 124 by decreasing the thickness thereof in an area apart from the head 31a.

Points to be noted with regard to the art described in the embodiment will be described. Cross sectional shapes of the EA member 20 (the first EA member 21, the second EA member 22) cut along planes perpendicular to the front-rear direction of the vehicle are identical regardless of the cutting positions along the front-rear direction. The EA member 20 (the first EA member 21, the second EA member 22) may be formed by extrusion molding of metal (typically, aluminum).

One bulkhead 60 may be fixed to the rocker 10 with single bolt 31. Or, one bulkhead 60 may be fixed to the rocker 10 with a plurality of bolts. Each of the bolts fixing one bulkhead 60 may pass through corresponding one of the collars 30, and the bolts may fix the EA member 20 to the rocker 10 via the collars 30.

The battery pack 40 is an example of "power source". The battery pack 40 houses the plurality of battery cells. The power source arranged between the pair of rockers 10 is not limited to the battery pack 40. The power source may be a device which houses capacitors or a device which houses fuel cells.

Each EA member 20 (each of the first EA members 21 and the second EA members 22) is a hollow beam having a rectangular tube shape. Therefore, "the first EA member" may be called as "the first beam" and "the second EA member" may be called as "the second beam".

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body lower structure comprising:
a rocker arranged at a lower lateral part of a vehicle body and extending along a front-rear direction of the vehicle body;
a power source arranged adjacent to the rocker;
an energy absorbing member arranged under the rocker, the energy absorbing member being a hollow beam; and
a collar penetrating an upper plate of the energy absorbing member and welded to the upper plate, wherein an upper end of the collar is in contact with the rocker and a lower end of the collar is in contact with a lower plate of the energy absorbing member,
wherein
the energy absorbing member includes a first vertical plate, a second vertical plate, and a diagonal brace;
the first vertical plate and the second vertical plate connect the upper plate and the log plate to each other,
the first vertical plate is arranged adjacent to the collar, the second vertical plate is arranged adjacent to the first vertical plate on an opposite side from the collar, and
the diagonal brace connects a first inner corner where the first vertical plate meets the lower plate and a second inner corner where the second vertical plate meets the upper plate.

2. The vehicle body lower structure of claim 1, wherein the power source is supported by the energy absorbing member.

3. The vehicle body lower structure of claim 1, wherein the rocker and the energy absorbing member are fixed to each other with a bolt passing through the collar.

4. The vehicle body lower structure of claim 1, wherein the energy absorbing member further includes a third vertical plate that connects the upper plate and the lower plate to each other and is arranged adjacent to the collar on an opposite side from the first vertical plate, and
a thickness of the upper plate in an area between the first vertical plate and the third vertical plate is thicker than a thickness of the upper plate outside of the area.

* * * * *